S. W. Jackson.
Cultivator.
N°. 62,272. Patented Feb. 19, 1867.
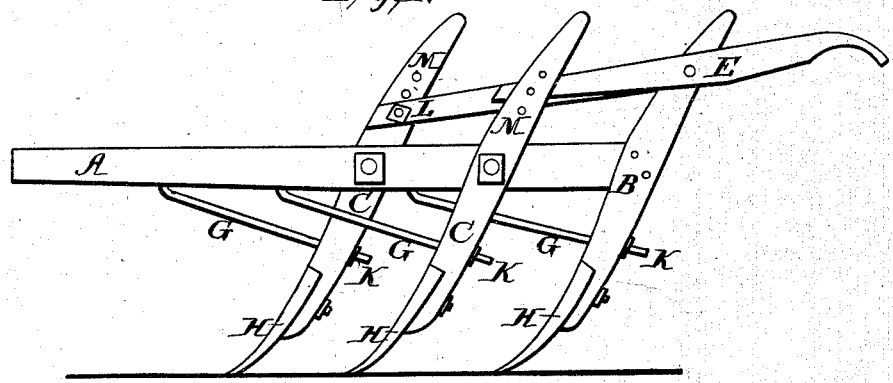
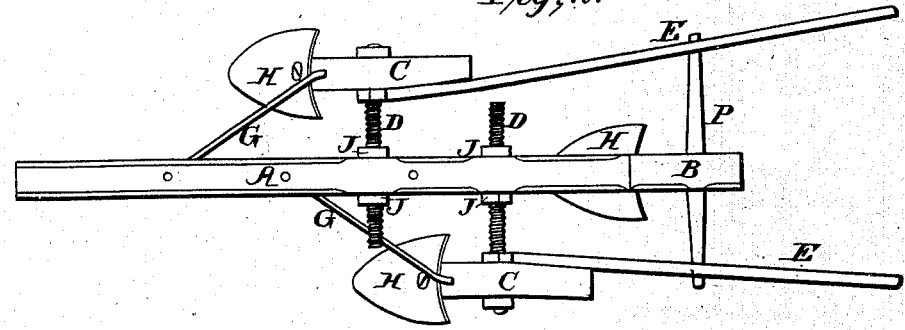
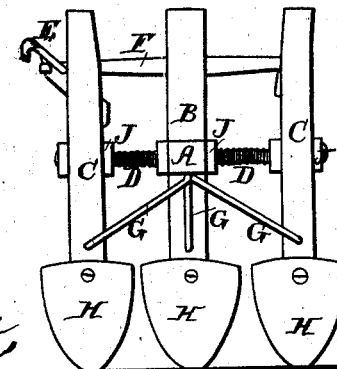
Witnesses;
J. H. Burridge
N. H. Burridge
Inventor;
S. W. Jackson

United States Patent Office.

S. W. JACKSON, OF BALDVILLE, OHIO.

Letters Patent No. 62,272, dated February 19, 1867.

IMPROVEMENT IN SHOVEL PLOUGHS.

The Schedule referred to in these Letters Patent and making part of the same.

TO ALL WHOM IT MAY CONCERN:

Be it known that I, S. W. JACKSON, of Baldville, in the county of Sandusky, and State of Ohio, have invented certain new and useful Improvements in Shovel Ploughs, &c.; and I do hereby declare that the following is a full and complete description of the construction and operation of the same, reference being had to the accompanying drawings, making a part of this specification, in which—

Figure 1 is a side view of the plough.
Figure 2 is a top view.
Figure 3 is a front view of the same.
Like letters of reference refer to like parts in the views.

This plough consists of the beam A, fig. 1, to the rear end of which is mortised the standard B; also on each side of the beam is attached a standard, C, by means of the screw-rods D, fig. 2. E are the handles which are secured to the standards above the beam, and are connected to the standard B by the rail F. G are braces, by the means of which the standards are kept in proper position. H are shovels or shares fitted to and bolted to the standards C B, and which are of the shape and curvature indicated in the drawing.

The operation of this implement is as follows: It is placed between the rows; the side shovels are then adjusted to the width of the same by the screw-rods referred to and the nuts J. The shape of the shovels is such as to throw the dirt against the hill on each side of the plough, more or less, as the distance the shovels may be spread to or from the rows. The standards being braced in the manner described, not only keep them in position, but give a general bracing to the implement, which, together with the broad shoulders of the mortise, and the angle it makes with the beam, makes the plough both strong and durable. The angular position which the standards hold to the beam may be varied by the thread and nut K, on the end of the braces G. By this adjustment of the shovels, the depth of the ploughing may be regulated by bringing them more or less to a vertical line, and thus throwing them deeper into the ground. The handles also are made adjustable by the bolt and nut L, which may be removed and inserted into holes, M; by this the height of the handles may be adapted to the convenience of the operator.

What I claim as my improvement, and desire to secure by Letters Patent, is—

The counter-braces G, adjustable screw-rods or arms D, provided with nuts J, in combination with standards B C, and adjustable handles E, arranged in the manner and for the purpose set forth.

S. W. JACKSON.

Witnesses:
W. H. BURRIDGE,
J. HOLMES.